(12) United States Patent
Yamanouchi

(10) Patent No.: US 10,809,368 B2
(45) Date of Patent: Oct. 20, 2020

(54) TARGET INFORMATION DETECTION SYSTEM AND TARGET INFORMATION DETECTION METHOD

(71) Applicant: NEC Corporation, Minato-ku, Tokyo (JP)

(72) Inventor: Shingo Yamanouchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 260 days.

(21) Appl. No.: 15/765,305

(22) PCT Filed: Sep. 21, 2016

(86) PCT No.: PCT/JP2016/004299
§ 371 (c)(1),
(2) Date: Apr. 2, 2018

(87) PCT Pub. No.: WO2017/064835
PCT Pub. Date: Apr. 20, 2017

(65) Prior Publication Data
US 2018/0275263 A1   Sep. 27, 2018

(30) Foreign Application Priority Data
Oct. 16, 2015  (JP) ................................ 2015-204174

(51) Int. Cl.
*G01S 13/536* (2006.01)
*G01S 13/38* (2006.01)
(Continued)

(52) U.S. Cl.
CPC ............ *G01S 13/536* (2013.01); *G01S 13/38* (2013.01); *G01S 13/584* (2013.01); *G01S 13/931* (2013.01); *G01S 2013/0272* (2013.01)

(58) Field of Classification Search
None
See application file for complete search history.

(56) References Cited

U.S. PATENT DOCUMENTS 4,143,370 A * 3/1979 Yamanaka ............ G01S 13/931
342/72
6,311,121 B1 10/2001 Kuragaki et al.
(Continued)

FOREIGN PATENT DOCUMENTS

JP   H9-286257 A   11/1997
JP   H11-198678 A   7/1999
(Continued)

OTHER PUBLICATIONS

Takayuki Inaba, "Multiple Target Detection for Stepped Multiple-Frequency Interrupted CW Radar", The transactions of the Institute of Electronics, Information and Communication Engineers, vol. J89-B, No. 3, pp. 373-383, 2006 (11 pages total).

(Continued)

*Primary Examiner* — Whitney Moore

(57) ABSTRACT

The target information detection system according to the present invention includes a measurement-side speed detection device for detecting the speed of a measurement-side moving body as a moving body speed, and a target-side speed detection device for detecting the speed of a target as a target speed, and when it is determined from a Doppler frequency that the relative speed of the measurement-side moving body and the target is equal to or less than a mode switching speed set in advance, a target information detection device switches a target information detection mode from a Doppler mode to a communication mode, acquires a moving-body speed via the measurement-side speed detection device and acquires a target speed via the target-side speed detection device, and calculates target information using the moving-body speed and the target speed.

2 Claims, 11 Drawing Sheets

(51) Int. Cl.
*G01S 13/58* (2006.01)
*G01S 13/931* (2020.01)
*G01S 13/02* (2006.01)

(56) References Cited

U.S. PATENT DOCUMENTS

| | | | |
|---|---|---|---|
| 2003/0174054 A1* | 9/2003 | Shimomura | G01S 13/72 340/435 |
| 2005/0242986 A1 | 11/2005 | Hanawa et al. | |
| 2009/0085796 A1 | 4/2009 | Kuroda et al. | |
| 2011/0301779 A1 | 12/2011 | Shida | |
| 2015/0145714 A1 | 5/2015 | Watanabe et al. | |

FOREIGN PATENT DOCUMENTS

| | | |
|---|---|---|
| JP | 2000-292530 A | 10/2000 |
| JP | 2002-71793 A | 3/2002 |
| JP | 2003-167048 A | 6/2003 |
| JP | 2004-69693 A | 3/2004 |
| JP | 2006-163615 A | 6/2006 |
| JP | 2006-258709 A | 9/2006 |
| JP | 2006-317456 A | 11/2006 |
| JP | 2008-145425 A | 6/2008 |
| JP | 2009-36514 A | 2/2009 |
| JP | 2009-42061 A | 2/2009 |
| JP | 2009-244136 A | 10/2009 |
| JP | 2013-250147 A | 12/2013 |
| WO | 2010/097943 A1 | 9/2010 |

OTHER PUBLICATIONS

Masato Watanabe, Manabu Akita, Takayuki Inaba, "Millimeter Wave Radar using Stepped Frequency Complementary Phase Code Modulation", ITS World Congress Tokyo 2013, 2013 (9 pages total).

Tetsuo Kirimoto, "Introduction of Automobile Radar", MWE2007 Digest, 2007, (8 pages total).

International Search Report dated Dec. 20, 2016 issued in international application No. PCT/JP2016/004299.

* cited by examiner

Fig. 3
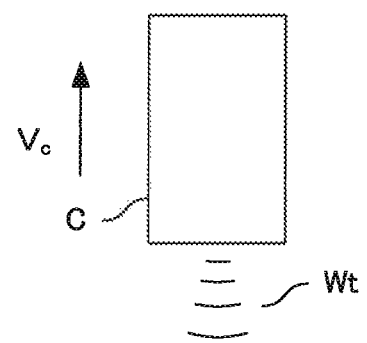
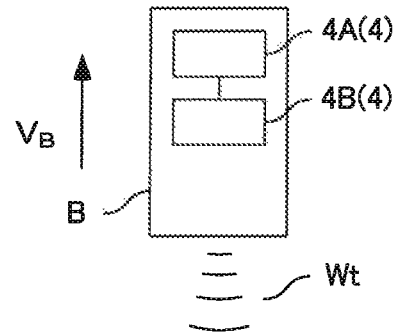
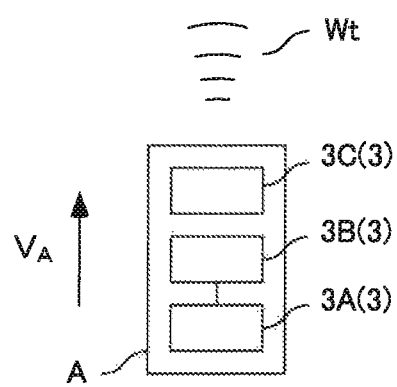

Fig. 6
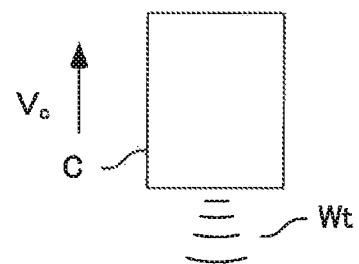
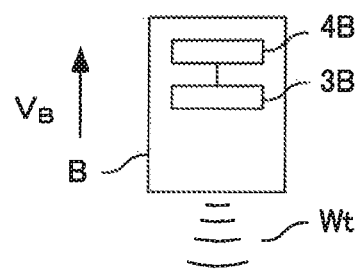
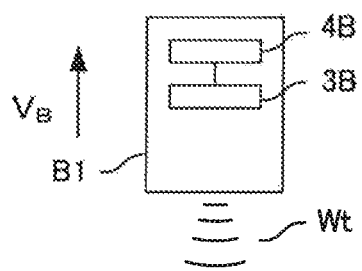
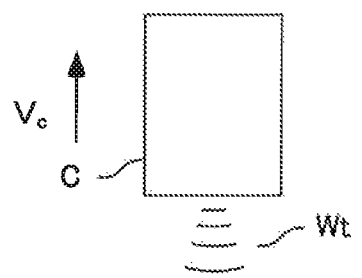
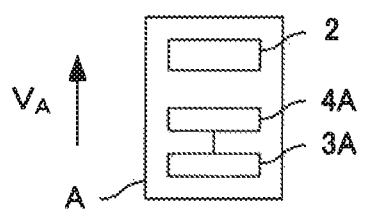

Fig. 7

| METHOD | | RF BANDWIDTH | BB BANDWIDTH | MEASUREMENT TIME | CONDITION |
|---|---|---|---|---|---|
| FM-CW | BANDWIDTH | 500MHz | 15kHz | Tm=30ms | |
| | CALCULATION FORMULA | $\sim c/(2\Delta R)$ | $\sim 2R/(\Delta RTm) + 2V/\lambda$ | $\sim \lambda/(2\Delta V)$ | |
| TWO-FREQUENCY CW | SIGNAL BANDWIDTH | 1.4MHz | 3.4kHz | Tc=30ms | PHASE ERROR $\Delta\phi=1°$ DISTANCE UPPER LIMIT $Rmax=c/(4B)=54m$ |
| | CALCULATION FORMULA | $\sim c\Delta\phi/(4\pi\Delta R)$ | $\sim 2V/\lambda$ | $\sim \lambda/(2\Delta V)$ | |
| PULSE/PULSE COMPRESSION | SIGNAL BANDWIDTH | 500MHz | 500MHz | Tc=30ms | |
| | CALCULATION FORMULA | $\sim c/(2\Delta R)$ | $\sim c/(2\Delta R)$ | $\sim \lambda/(2\Delta V)$ | |
| MULTI-FREQUENCY CPC | SIGNAL BANDWIDTH | 500MHz | 80MHz | Tc=29ms | |

SIGNAL BANDWIDTH AND MEASUREMENT TIME REQUIRED TO SATISFY THE FOLLOWING CHARACTERISTIC VALUES:
DISTANCE RESOLUTION $\Delta R$=0.3m, VELOCITY RESOLUTION $\Delta V$=0.3km/h, RF FREQUENCY fc=60.5GHz,
DISTANCE R=50m, VELOCITY V=30km/h
c: SPEED OF LIGHT, $\Delta\phi$: PHASE ERROR, Tm MODULATION REPETITION TIME, Tc MEASUREMENT TIME, $\lambda$: RF SIGNAL WAVELENGTH, B: RF SIGNAL BANDWIDTH

TARGET INFORMATION DETECTION SYSTEM AND TARGET INFORMATION DETECTION METHOD

This application is a National Stage Entry of PCT/JP2016/004299 filed on Sep. 21, 2016, which claims priority from Japanese Patent Application 2015-204174 filed on Oct. 16, 2015, the contents of all of which are incorporated herein by reference, in their entirety.

TECHNICAL FIELD

The present invention relates to a target information detection system and a target information detection method for measuring target information such as a distance to a target and a relative velocity.

BACKGROUND ART

An automotive radar emits a radio wave toward a target such as another vehicle or an obstacle, and receives the reflected wave reflected by this target. The presence of the target, the distance (target distance) to the target, and the relative velocity of the target are measured by analyzing a received signal of the received wave (reflected wave). Hereinafter, the presence of target, the target distance, and the relative velocity of target are collectively referred to as target information.

Such automotive radar is used as a system for improving the mobility safety of a car such as a collision mitigation (brake) system and a preceding vehicle following system. At this time, improving the detection resolution of target is important for improving reliability and mobility safety.

In general, the detection resolution in the distance direction is improved by widening bandwidths of the RF (Radio Frequency) signal and the baseband signal (BB signal) used as the basis of the radio wave to be radiated. However, it is desirable to narrow the bandwidth of RF signals and baseband signals (BB signals) while improving detection resolution. This is because narrowing the bandwidth of the signal makes it easier to design a circuit with required detection resolution and to reduce the system cost. Furthermore, if a desired detection resolution can be obtained with a narrow RF signal bandwidth, the number of usable channels increases, and accordingly, there is also an advantage in that radio wave interference between automotive radars is suppressed.

As such automotive radar, FMCW (Frequency Modulated Continuous Wave) radar, pulse radar, pulse compression radar are known. Multifrequency CW radar using continuous wave (CW: continuous wave) switching frequency with time, multifrequency ICW (Interrupted Continuous Wave) radar (see NPL 1) combining multiple frequency CW radar method and pulse radar method have been proposed. In addition, a multi-frequency CPC (Complementary Phase Code) radar method (see NPL 2) combining a multi-frequency CW radar method and a pulse compression radar method has been proposed.

Here, in the various automotive radars, the bandwidth of the required RF signal and BB signal will be considered. FIG. 7 is a diagram summarizing the bandwidths of the RF signal and BB signal necessary for detecting the target with a predetermined detection resolution using an RF signal having a frequency fc of 60.5 [GHz]. It is assumed that the target is located in front of the automotive radar, the target distance R is R=50 [m], and the velocity V is V=30 [km/h].

Then, the distance resolution $\Delta R$ is set as $\Delta R=0.3$ [m] and the velocity resolution $\Delta V$ is set as $\Delta V=0.3$ [km/s].

In FIG. 7, the signal bandwidths in the FM-CW method, the two-frequency CW method, the pulse method, and the pulse compression method are calculated from the formulas shown in the lower row of each method (see NPL 3). In addition, the value of the signal bandwidth in the multi-frequency CPC method quotes the measured value in NPL 2. In the two-frequency CW method, the number of frequencies used in the multi-frequency CW method is 2.

From FIG. 7, it can be seen that a two-frequency CW method capable of suppressing both the bandwidth of the RF signal and the BB signal is effective for achieving the desired distance resolution $\Delta R$.

Both the FM-CW method and the pulse/pulse compression method require a broadband RF signal bandwidth given by $c/(2\Delta R)$, where c denotes the velocity of light and $\Delta R$ denotes the distance resolution. Although the multi-frequency CPC method is a combination of a multi-frequency CW method and a pulse compression method, a broadband RF signal bandwidth similar to the pulse compression used for the combination is still required.

The two-frequency CW method (or multi-frequency CW method) has an advantage in that both the bandwidth of the RF signal and the BB signal can be suppressed. However, when there are multiple targets of the same velocity as automotive radar, there is a problem in that each target cannot be recognized individually (target information corresponding to each target cannot be acquired).

A problem in such a two-frequency CW method will be described with reference to a block diagram of automotive radar (see NPL 3) in the two-frequency CW method shown in FIG. 8.

First, the principle of calculating the target distance will be described. FIG. 8 is a block diagram of the automotive radar of the two-frequency CW method. This automotive radar includes an antenna 101, a circulator 102, a mixer 103, a low-pass filter (LPF) 104, an oscillator 105, an analog-to-digital (A/D) converter 106, a Fourier transform unit 107, an arithmetic unit 109, a controller 110. The Fourier transform unit 107 includes two units, i.e., a Fourier transforming device $108_1$ and a Fourier transforming device $108_2$.

Then, as shown in FIG. 9, the oscillator 105 switches the RF signal (transmission signal) of the two frequencies $f_1$, $f_2$ in accordance with an instruction from the controller 110 and outputs it to the circulator 102 and the mixer 103. In FIG. 9, Tc denotes a period.

The RF signal output from the oscillator 105 to the circulator 102 is output as the transmission wave Wt via the antenna 101. The transmission wave Wt is reflected by the target T and received by the antenna 101 as the reception wave Wr.

Receiving the Doppler effect by the target T of the relative velocity V, the frequency of the reception wave Wr shifts by Doppler frequency $f_d$ ($=2V/\lambda$, $\lambda$ is the wavelength of the transmission wave Wt) with respect to the frequency of the transmission wave Wt (Doppler shift).

The reception wave Wr received by the antenna 101 is input to the mixer 103 via the circulator 102. The mixer 103 mixes the transmission signals of the frequencies $f_1$, $f_2$ from the oscillator 105 and the reception signals of the reception frequencies $f_1+f_d$, $f_2+f_d$, and outputs the mixed signals to the A/D transforming device 106 via the BPF 104. A signal input to the A/D transforming device 106 will be referred to as a beat signal. The frequency of this beat signal is the Doppler frequency $f_d$.

Where the beat signals are denoted as $S_{f1}(t)$, $S_{f2}(t)$ when the frequencies of the RF signal output from the oscillator 105 are $f_1$, $f_2$, and an indefinite constant of automotive radar is denoted as $\varphi_0$, the beat signals $S_{f1}(t)$, $S_{f2}(t)$ are given by the expressions 1, 2.

$$S_{f1}(t) \propto \cos[2\pi f_d t - 4\pi f_1 R/c + \varphi_0] \quad (1)$$

$$S_{f2}(t) \propto \cos[2\pi f_d t - 4\pi f_2 R/c + \varphi_0] \quad (2)$$

The beat signal is converted to a digital signal by the A/D transforming device 106 and input to the Fourier transform unit 107, and the spectral phase is obtained by the Fourier transform unit 107.

When the frequency of the transmission wave Wt is $f_1$, the spectral phase $\varphi 1$ ($=\varphi_0 - 4\pi f_1 R/c$) of the reception wave Wr is calculated by the Fourier transforming device $108_1$. When the frequency of the transmission wave Wt is $f_2$, the spectral phase $\varphi 2$ ($=\varphi_0 - 4\pi f_2 R/c$) of the reception wave Wr is calculated by the Fourier transforming device $108_2$.

The selection of the Fourier transforming devices $108_1$ and $108_2$ used for calculating the spectral phase is performed on the basis of a command output to the Fourier transform unit 107 in synchronism with the switching timing signal of the frequency of the RF signal (transmission wave Wt) output from the controller 110 to the oscillator 105.

Since the difference $\Delta\varphi$ between the spectral phases $\varphi_1$ and $\varphi_2$ of the beat signals $S_{f1}(t)$, $S_{f2}(t)$ is given by $\Delta\varphi = \varphi_1 - \varphi_2$, an arithmetic device 19 uses this to calculate the target distance R by expression 3.

$$R = c\Delta\varphi/4\pi(f_2 - f_1) \quad (3)$$

Next, the case where two targets $T_1$, $T_2$ are simultaneously detected as shown in FIG. 10 based on such a target distance calculation principle will be considered. At this time, the relative velocities of the two target $T_1$ and $T_2$ are denoted as $V_1$ and $V_2$, respectively.

The beat signal output from the BPF 104 is a superposition of the beat signal $S_1$ by the target $T_1$ included in the reception wave Wr and the beat signal $S_2$ by the target $T_2$ ($S = S_1 + S_2$). The frequencies of the beat signals $S_1$ and $S_2$ are Doppler frequencies $f_{d1} = 2V_1/\lambda$, $f_{d2} = 2V_2/\lambda$, respectively. That is, when simultaneously detecting the target targets $T_1$, $T_2$, the spectrum of the beat signal is in a state in which two spectra consisting of beat signals $S_1$, $S_2$ appear as shown in FIG. 11.

At this time, the Doppler frequencies $f_{d1} = 2V_1/\lambda$, $f_{d2} = 2V_2/\lambda$ of the beat signals $S_1$, $S_2$ also have different values when the velocities $V_1$ and $V_2$ are different between the two target $T_1$ and $T_2$ ($V1 \neq V2$) ($f_{d1} \neq f_{d2}$). Therefore, as shown in FIG. 11, since the spectra of the beat signals $S_1$ and $S_2$ are observed as spectra of different frequencies, the spectral phases of the beat signals $S_1$ and $S_2$ can be separately obtained. Thus, from the detected spectral phase and the expression 3, the target distances of the targets $T_1$ and $T_2$ can be calculated individually.

On the other hand, when the velocities $V_1$ and $V_2$ of the targets $T_1$ and $T_2$ are the same ($V_1 = V_2$), the frequencies $f_{d1} = 2V_1/\lambda$, $f_{d2} = 2V_2/\lambda$ of the beat signals $S_1$, $S_2$ also have the same values ($f_{d1} = f_{d2}$). Therefore, as shown in FIG. 12, the spectral phases of the beat signals $S_1$ and $S_2$ have the same frequency, and the beat signals $S_1$ and $S_2$ cannot be separately detected. Therefore, there arises a problem in that the target distances of the targets $T_1$, $T_2$ cannot be individually calculated.

As a method to solve the problem of the two-frequency CW method, a method combining a multi-frequency CW method and a pulse method has been proposed in PTL 1 (equivalent to a multi-frequency CPC method).

In this proposal, switching is made from the two-frequency CW method to another radar method in a situation where the two-frequency CW method cannot deal with (in the case where the relative velocity of the target is "0" or there are two or more target of the same velocity).

Here, unlike the two-frequency CW method, the another radar method is a method capable of detecting the target even in a situation where the two-frequency CW method cannot cope with (in the case where the relative velocity of the target is "0" or there are two or more target of the same velocity). Examples of such methods include FMCW method in PTLs 1, 2, the FMCW method or the frequency pulse CW method in PTLs 3, 4, and the two frequency Ramp modulation method in PTL 5, 6.

CITATION LIST

Patent Literature

[PTL 1] Specification of Japanese Patent Laid-Open No. 2000-292530
[PTL 2] Specification of Japanese Patent Laid-Open No. 2002-71793
[PTL 3] Specification of Japanese Patent Laid-Open No. 2004-69693
[PTL 4] Specification of Japanese Patent Laid-Open No. 2006-317456
[PTL 5] Specification of Japanese Patent Laid-Open No. 2006-258709
[PTL 6] Specification of Japanese Patent Laid-Open No. 2009-36514
[PTL 7] Specification of Japanese Patent Laid-Open No. 2009-244136
[PTL 8] Specification of Japanese Patent Laid-Open No. 2003-167048
[PTL 9] Specification of Japanese Patent Laid-Open No. 2009-42061
[PTL 10] Specification of Japanese Patent Laid-Open No. 11-198678
[PTL 11] Specification of Japanese Patent Laid-Open No. 2006-163615
[PTL 12] Specification of Japanese Patent Laid-Open No. 2013-250147

Non Patent Literature

[NPL 1] INABA Takayuki, "Multiple Target Detection for Stepped Multiple Frequency Interrupted CW Radar", The transactions of the Institute of Electronics, Information and Communication Engineers. B, Vol. J89-B, No. 3, pp. 373-383, 2006
[NPL 2] Masato Watanabe, Manabu Akita, Takayuki Inaba, "Millimeter Wave Radar using Stepped Frequency Complementary Phase Code Modulation", ITS WORLD CONGRESS TOKYO 2013, 2013
[NPL 3] KIRIMOTO Tetsuo, "Basics of Automobile Radar", MWE2007 Digest, 2007

SUMMARY OF INVENTION

Technical Problem

However, in each of the above-mentioned methods, when the relative velocity between the automotive radar and the target is "0" or the like, the RF signal or the BB signal becomes a wide band when a method other than the two-frequency CW method is used. Therefore, this makes the circuit design difficult, and the system cost increases. Furthermore, as the bandwidth of the RF signal is increased, the spectral efficiency is reduced, and interference between radio waves may occur.

There is also a problem in that the RF signal or the BB signal becomes broadband even in the case of using as a radar the time waveform combined for which the multi-frequency CW method and the pulse method of PTL 7 to enable target detection even when there are a plurality of targets having the same velocity.

In addition, in a case of mixing the reception wave and the high-speed sawtooth wave using the normal two-frequency CW waveform for the transmission wave of PTL 8 as a method of detecting the target of relative velocity "0" using the two-frequency CW method, multiple targets of the same velocity are detected separately, so that the bandwidth of the RF signal (transmission wave) can be narrowed, but the bandwidth of the BB signal becomes broadband due to the influence of the sawtooth wave. This makes it difficult to design circuits and poses a problem of high system cost.

As a method to solve the first and second problems of the two-frequency CW method, a method for switching the transmission frequency of the transmission radio wave with timing synchronized with the sample frequency of the A/D conversion has been suggested as disclosed in PTL 9. However, this method also has a problem in that the RF signal becomes broadband. In the embodiment of PTL 9, the bandwidth of the RF signal is 1 GHz.

Furthermore, as a method to solve the problem of the two-frequency CW method, as disclosed in PTL 10, when the relative velocity between automotive radar and target approaches "0", the method of controlling the velocity (throttle/brake) of the vehicle carrying the automotive radar so as to change the relative velocity involves a problem in that the velocity of the vehicle becomes unstable.

Therefore, it is a main object of the present invention to provide a target information detection device and a target information detection method that facilitate designing and enable separation and detection of multiple targets of the same velocity using an inexpensive narrow-band RF signal and BB signal.

Solution to Problem

In order to solve the above problems, an invention relating to a target information detection system that emits a transmission wave of a predetermined frequency from a measurement-side moving body to a plurality of targets and obtains, as target information, a distance between the measurement-side moving body and the target from a Doppler frequency contained in a reflected wave thereof includes a target information detection device calculating the target information based on the Doppler frequency, a measurement-side velocity detection device detecting a velocity of the measurement-side moving body as a moving body velocity, a measurement-side unit including at least a measurement-side communication device communicating with the target information detection device and the measurement-side velocity detection device, the measurement-side unit being mounted on the measurement-side moving body, a target-side velocity detection device detecting a velocity of the target as a target velocity, and a target-side unit including at least a target-side communication device communicating with the target-side velocity detection device and the measurement-side communication device, the target-side unit being mounted on the target, wherein in a case where the target information detection device determines from the Doppler frequency that the relative velocity between the measurement-side moving body and the target is equal to or less than a mode switching velocity, the target information detection device switches a target information detection mode from a Doppler mode to a communication mode and obtains the moving body velocity via the measurement-side communication device, and obtains the target velocity via the measurement-side communication device and the target-side velocity detection device, and calculates the target information using the moving body velocity and the target velocity.

An invention relating to a target information detection method of emitting a transmission wave of a predetermined frequency from a measurement-side moving body to a plurality of targets and obtaining, as target information, a distance between the measurement-side moving body and the target from a Doppler frequency contained in a reflected wave thereof includes causing a target information detection device to calculate the target information based on the Doppler frequency, causing a measurement-side velocity detection device to calculate a velocity of the measurement-side moving body as a moving body velocity, causing a measurement-side communication device to communicate with the target information detection device and the measurement-side velocity detection device, causing a target-side velocity detection device to detect a velocity of the target as a target velocity, causing a target-side communication device to communicate with the target-side velocity detection device and the measurement-side communication device, and in a case where a relative velocity between the measurement-side moving body and the target is determined, from the Doppler frequency, to be equal to or less than a mode switching velocity, switching a target information detection mode from a Doppler mode to a communication mode and obtaining the moving body velocity via the measurement-side communication device, and obtaining the target velocity via the measurement-side communication device and the target-side velocity detection device, and calculating the target information using the moving body velocity and the target velocity.

Advantageous Effect of Invention

According to the present invention, a target information detection device and a target information detection method that facilitate designing and enable separation and detection of multiple targets of the same velocity using an inexpensive narrow-band RF signal and BB signal.

BRIEF DESCRIPTION OF DRAWINGS

FIG. 3 is a view for explaining target information detection by a target information detection system according to a second embodiment.

FIG. 6 is an explanatory diagram of a target information detection system according to a third embodiment.

FIG. 7 is a diagram summarizing bandwidths of RF signal and BB signal necessary for detecting a target with a predetermined detection resolution, which is applied to the description of the related art.

DESCRIPTION OF EMBODIMENTS

First Embodiment

Figure 1:
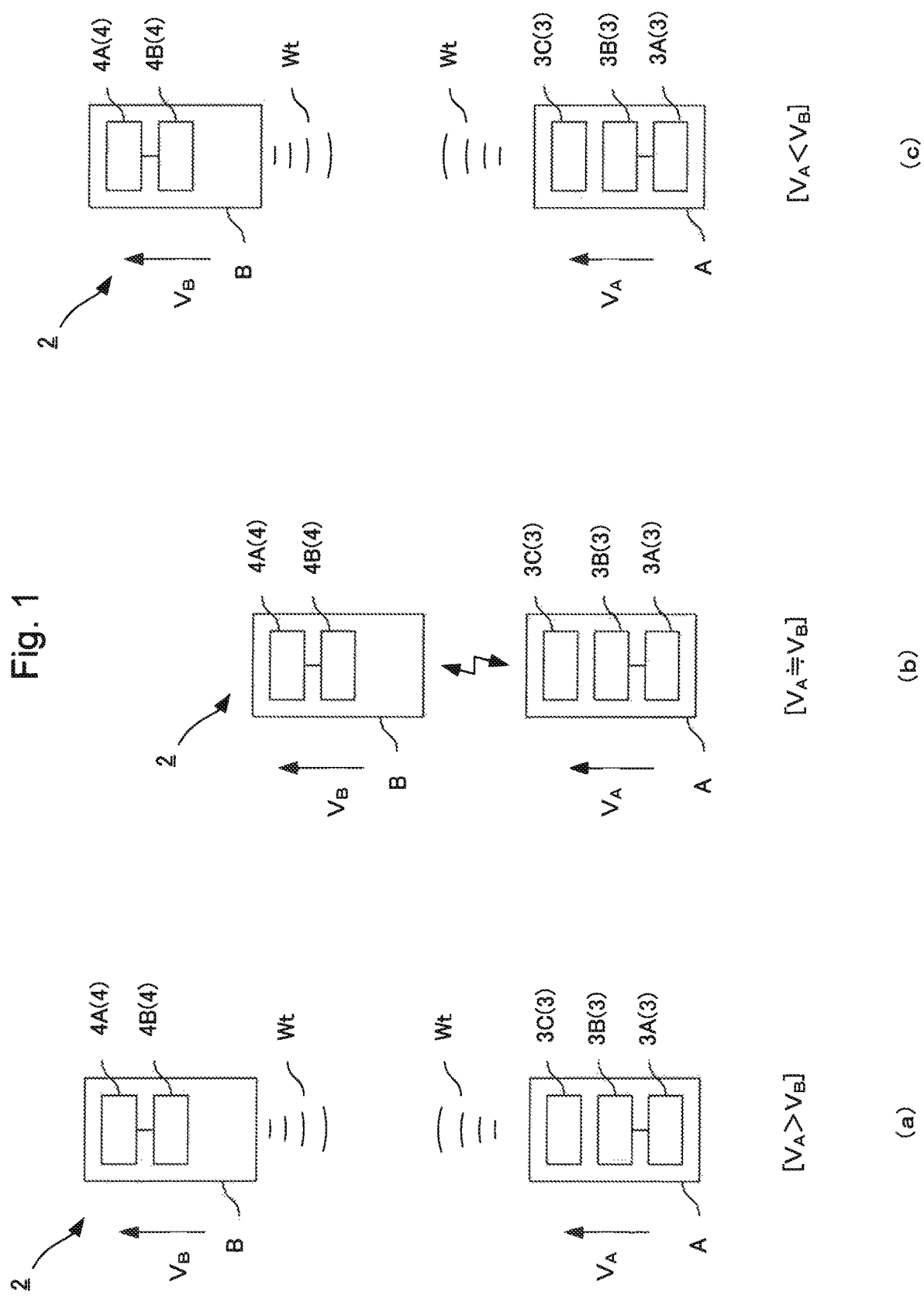
FIG. 1 is an explanatory diagram of a target information detection system according to a first embodiment.

Embodiments of the present invention will be explained. FIG. 1 is an explanatory diagram of a target information detection system 2 according to the present embodiment. The target information detection system 2 includes a measurement-side unit 3 and a target-side unit 4.

In FIG. 1, a vehicle (moving body) A and a vehicle (target) B are illustrated, for example, and the measurement-side unit 3 is mounted on vehicle A and the target-side unit 4 is mounted on vehicle B. FIG. 1 (a) shows the case where the velocity of the vehicle A>the velocity of the vehicle B, (b) shows the case where the velocity of the vehicle A ÷ the velocity $V_B$ of the vehicle B, and (c) shows the case where the velocity $V_A$ of the vehicle A ÷ the velocity $V_B$ of the vehicle B.

Then, the measurement-side unit 3 mounted on the vehicle A acquires the inter-vehicle distance (target information) between the vehicle A and the vehicle B. It should be noted that the target information may also include information about the relative velocity between vehicle A and vehicle B, the existence of vehicle B, and the like. The vehicle A and the vehicle B are examples and they are not limited to vehicles. For example, a conveyance carrier in a factory may be used, and vehicle B may be a stationary object.

The measurement-side unit 3 includes a measurement-side velocity detection device 3A, a measurement-side communication device 3B, and a target information detection device 3C. The measurement-side velocity detection device 3A detects the velocity (moving body velocity) of the vehicle A. The measurement-side communication device 3B communicates with the target information detection device 3C and the measurement-side velocity detection device 3A and also communicates with the target-side communication device 4B. The target information detection device 3C detects the target information of the vehicle B using the Doppler frequency or the like due to the relative velocity between the vehicle A and the vehicle B.

The target-side unit 4 includes the target-side velocity detection device 4A and the target-side communication device 4B. The target-side velocity detection device 4A detects the velocity (target velocity) of the target. The target-side communication device 4B communicates with the target-side velocity detection device 4A and the measurement-side communication device 3B.

The measurement-side velocity detection device 3A and the target-side velocity detection device 4A may be velocity detection devices such as velocity meters attached to the vehicle A and vehicle B and the like (or combination thereof may be used).

When the target information detection device 3C determines from the Doppler frequency that the relative velocity between the vehicle A and the vehicle B is not more than a predetermined velocity, the target information detection device 3C acquires the moving body velocity via the measurement-side communication device 3B and acquires the target velocity via the measurement-side communication device 3B and the target-side velocity detection device 4A. Thereafter, the target information detection device 3C calculates the target information using the moving body velocity and the target velocity. It should be noted that the target information detection device 3C preferably uses a two-frequency CW method (or a multi-frequency CW method).

In the following description, it is assumed that the velocities of the vehicle A and the vehicle B are denoted as $V_A$ and $V_B$, and the vehicle B moves in front of the vehicle A, and the vehicle A and the vehicle B are moving in the same direction. However, the present embodiment is not limited to such conditions. That is, the vehicle B may be moving in the direction opposite to the movement direction of the vehicle A. Therefore, the emission direction of the transmission wave Wt is not limited to the movement direction of the vehicle A. Assuming such various cases, the transmission wave Wt may be emitted while changing the emission direction to the front, the rear, the left, and to the right at predetermined time intervals.

Figure 2:
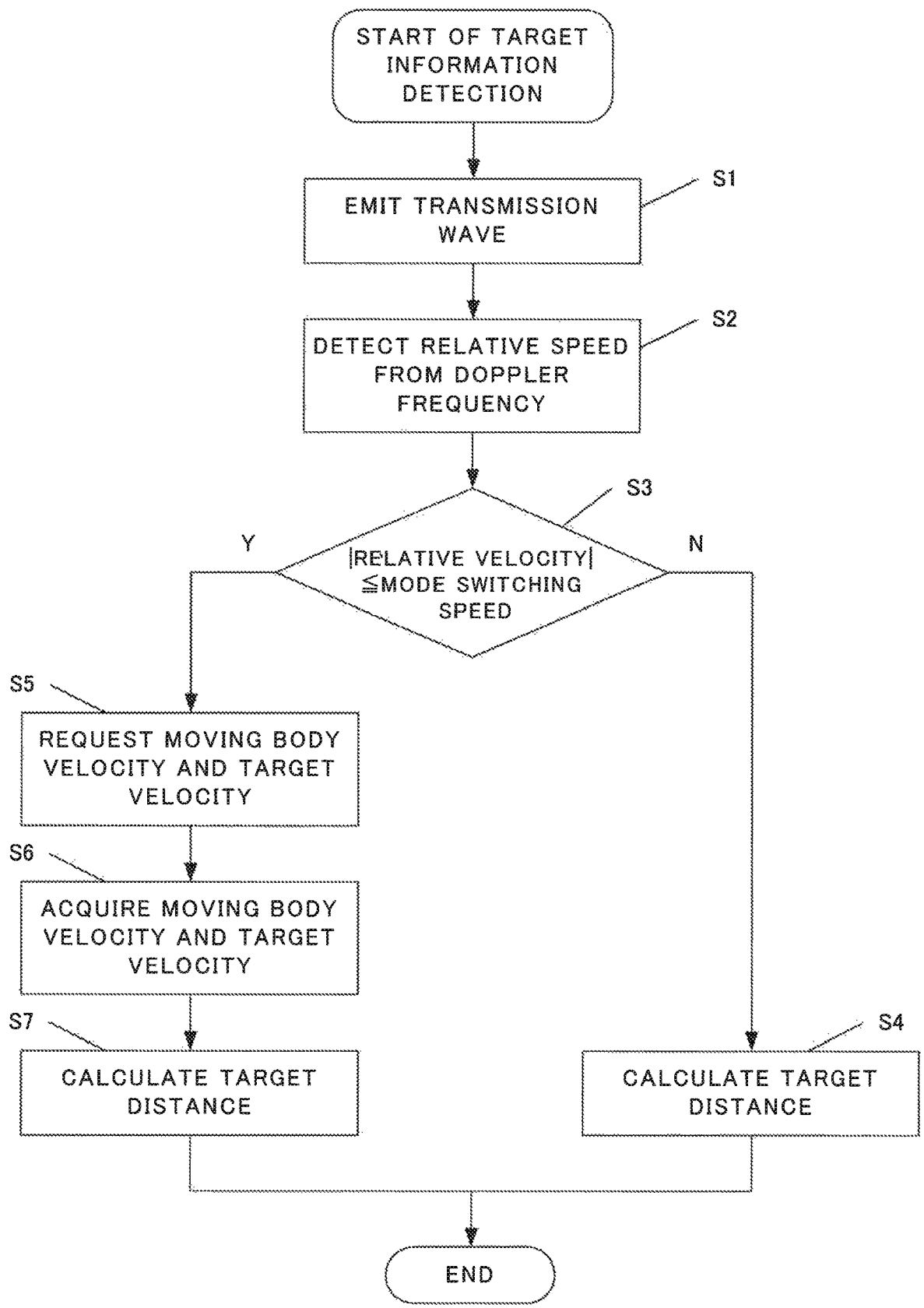
FIG. 2 is a flow chart showing a target information detection procedure.

The target information detection procedure will be described with reference to the flowchart shown in FIG. 2.

Step S1, S2: When processing is started, the target information detection mode is set to the Doppler mode. It should be noted that the target information detection mode includes a Doppler mode for acquiring target information from the Doppler frequency and a communication mode for acquiring target information from the measured value of the relative velocity.

In this state, the target information detection device 3C transmits N transmission signals of different frequencies and receives reflected waves from the target. Then, the Doppler frequency is calculated from the difference between the transmission signal and the reception signal.

Step S3: The Doppler frequency is proportional to the relative velocity between vehicle A and target T. Therefore, it is determined whether or not the absolute value of the calculated relative velocity is less than or equal to a preset mode switching velocity. The target distance is calculated by integrating the relative velocity of vehicle A and vehicle B as described later. Therefore, in the case of the velocity $V_A$ ÷ the velocity $V_B$ (that is, the absolute value of relative velocity≤mode switching velocity), the measurement error of velocity $V_A$ and velocity $V_B$ accumulates and becomes large, which degrades the detection precision of the target distance. The mode switching velocity is a value set according to an allowable detection precision of the target distance.

With regard to relative velocities of the vehicle A and the vehicle B, there are (1) a case where velocity $V_A$>velocity $V_B$ (corresponding to FIG. 1(a)), (2) a case where velocity $V_A$ ÷ velocity $V_B$ (corresponding to FIG. 1(b)), and (3) a case where the velocity $V_A$<the velocity $V_B$ (corresponding to FIG. 1(c)). (1) In the case where the velocity $V_A$>the velocity $V_B$, and (3) in the case where the velocity $V_A$<the velocity $V_B$, it is assumed that the absolute value of the relative velocity>the mode switching velocity. (2) In the case where the velocity $V_A \div$ the velocity $V_B$, it is assumed that the absolute value of the relative velocity≤the mode switching velocity.

(1) In the case where the velocity $V_A$>the velocity $V_B$, and (3) in the case where the velocity $V_A$<the velocity $V_B$, the absolute value of the relative velocity>the mode switching velocity. Thus, the target information detection device 3C switches to the Doppler mode and uses the Doppler frequency to calculate the target information (proceeds to step S4). On the other hand, (2) in the case where the velocity $V_A \div$ the velocity $V_B$, the absolute value of the relative velocity≤the mode switching velocity. Thus, the mode is switched to the communication mode (proceeds to step S5), and the target distance is calculated by integrating the measured relative velocity.

Step S4: (in the case where the absolute value of the relative velocity>the mode switching velocity: Doppler mode)

In this case, the distance (target distance) between the vehicle A and the vehicle B decreases with the elapse of time (the vehicle A and the vehicle B approach each other), or the target distance increases with the elapse of time (the vehicle A and vehicle B moves away). That is, the relationship "the absolute value of the relative velocity>the mode switching velocity" is satisfied.

In the reception wave Wr, the frequency is Doppler-modulated according to the relative velocity of the vehicle A and the vehicle B with respect to transmission wave Wt, and the frequency of the reception wave Wr is shifted by the Doppler frequency $f_d$ with respect to the frequency of the transmission wave Wt. Therefore, the target information detection device 3C calculates the Doppler frequency based on the transmission wave Wt and the reception wave Wr, and acquires the target information such as the relative position, the target distance, and the relative velocity of the vehicle B.

When mode switching is performed, it is preferable to reset the target information on the vehicle B acquired in the previous mode in order to improve the accuracy of the target information in each mode. This reset processing means resetting the initial value.

Steps S5 to S7: (the case where the absolute value of the relative velocity≤the mode switching velocity: communication mode)

On the other hand, In the case of velocity $V_A \div$ velocity $V_B$, the relationship of the absolute value of the relative velocity≤mode switching velocity is satisfied as shown in FIG. 1(b), so that there is almost no change in the target distance with time. In such a case, since the Doppler frequency $f_d$ becomes close to zero, i.e., $f_d \div 0$ in the two-frequency CW method (or multi-frequency CW method), it is difficult to acquire the target information about the vehicle B with high accuracy.

Therefore, in the case where the target information detection device 3C determines that the Doppler frequency $f_d \div 0$, the target information detection device 3C outputs a velocity request command to the measurement-side communication device 3B. Upon receiving the velocity request command, the measurement-side communication device 3B requests the measurement-side velocity detection device 3A to send the current velocity of its own vehicle (vehicle A). As a result, the velocity $V_A$ of the vehicle A is sent from the measurement-side velocity detection device 3A to the target information detection device 3C via the measurement-side communication device 3B.

Upon receiving the velocity request command, the measurement-side communication device 3B transmits the velocity request command to the target-side communication device 4B. Upon receiving this velocity request command, the target-side communication device 4B acquires the current velocity of the target (vehicle B) from the target-side velocity detection device 4A and transmits the velocity of the current target (vehicle B) via the target-side communication device 4B to the target information detection device 3C.

With these processing, the target information detection device 3C acquires the velocity $V_A$ of the vehicle A and the velocity $V_B$ of the vehicle B, and calculates the relative velocity $\Delta V$ according to the expression 4 shown below.

$$\Delta V = V_B - V_A \qquad (4)$$

Then, the target information detection device 3C calculates the target distance R according to the expression 5 shown below using this relative velocity.

$$R = R_0 + \int \Delta V \cdot dt \qquad (5)$$

Here, $R_0$ denotes the target distance between vehicle A and vehicle B at the time of mode switching.

As described above, in a system for acquiring target information using the two-frequency CW method (or multi-frequency CW method), even when the Doppler frequency cannot be measured with high accuracy (in the case where the absolute value of the relative velocity≤the mode switching velocity), the existence of vehicle B can be detected with high accuracy and the target information can be acquired by using the measurement-side velocity detection device, the measurement-side communication device, the target-side velocity detection device, and the target-side communication device.

Second Embodiment

Next, a second embodiment of the present invention will be described. It should be noted that the same reference numerals are used for the same components as those of the first embodiment, and the description thereof is appropriately omitted.

In the first embodiment, by separately using the communication means and the velocity detection means, target information of the target can be acquired even when the target is moving at the same velocity as its own device. However, when there are multiple targets, it is difficult to identify each of the multiple targets and acquire target information of each target. Therefore, the present example embodiment enables acquisition of target information of each target even in such case.

FIG. 3 is a diagram for explaining target information detection by the target information detection system 2 in such a system. The vehicle (moving body) A moving at velocity $V_A$ detects the target information about the vehicle (first type target) B moving with velocity $V_B$ and the vehicle (second type target) C moving with velocity $V_C$.

The measurement-side velocity detection device 3A, the measurement-side communication device 3B, the target information detection device 3C are mounted on vehicle A. The target-side velocity detection device 4A and the target-side communication device 4B are mounted on the vehicle B. However, the vehicle C does not include such velocity detection means or communication means. It does not matter which one of the vehicle B and the vehicle C becomes from front or back from the point of view of vehicle A.

Figure 4:
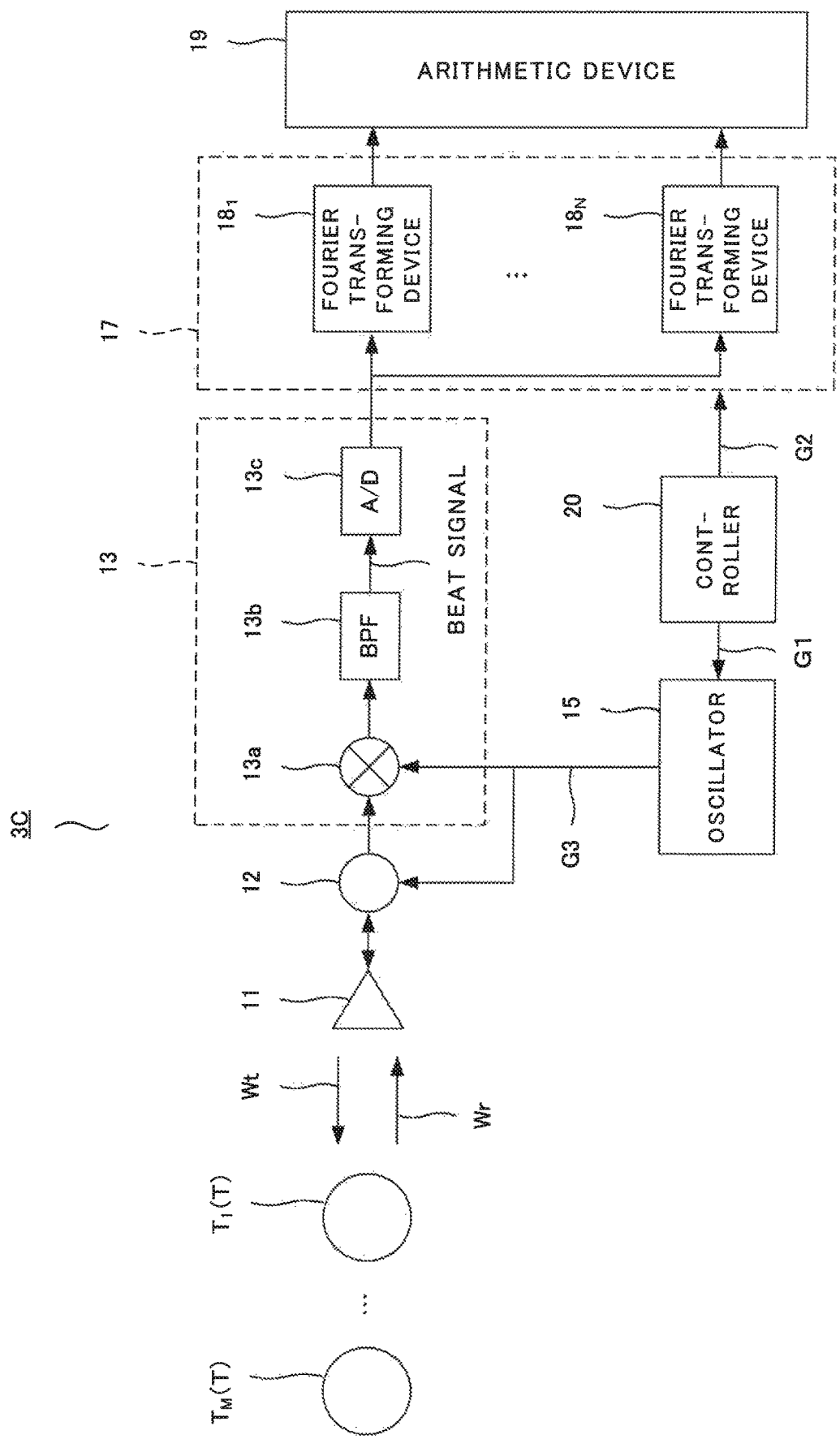
FIG. 4 is a block diagram of a target information detection device.

FIG. 4 is a block diagram of the target information detection device 3C. The target information detection device 3C includes at least an antenna 11, a circulator 12, a mixer unit 13, an oscillator 15, a Fourier transform unit 17, an arithmetic device 19, and a controller 20. The mixer unit 13 includes a mixer 13a, a band pass filter (BPF) 13b, and an analog-to-digital (A/D) conversion device 13c. The Fourier transforming unit 17 contains N Fourier transforming devices $18_1 \ldots 18_N$.

The target T includes M targets $T_1 \ldots T_M$, and each target T moves at the same velocity. Then, the target information detection device 3C identifies a plurality of targets T and acquires target information of each target. Although FIG. 4 shows the target T, it should be understood that the target T does not constitute the target information detection device 3C.

In order to acquire target information about a plurality of targets T in this way, as described above, the Fourier transforming unit 17 is composed of N Fourier transforming devices $18_1 \ldots 18_N$. In the following, since each Fourier transforming device $18_1 \ldots 18_N$ is different only in the frequency of the signal to be processed, it may be described as, e.g., a Fourier transforming device 18 or a Fourier transforming device $18_i$ for a common explanation.

Figure 5:
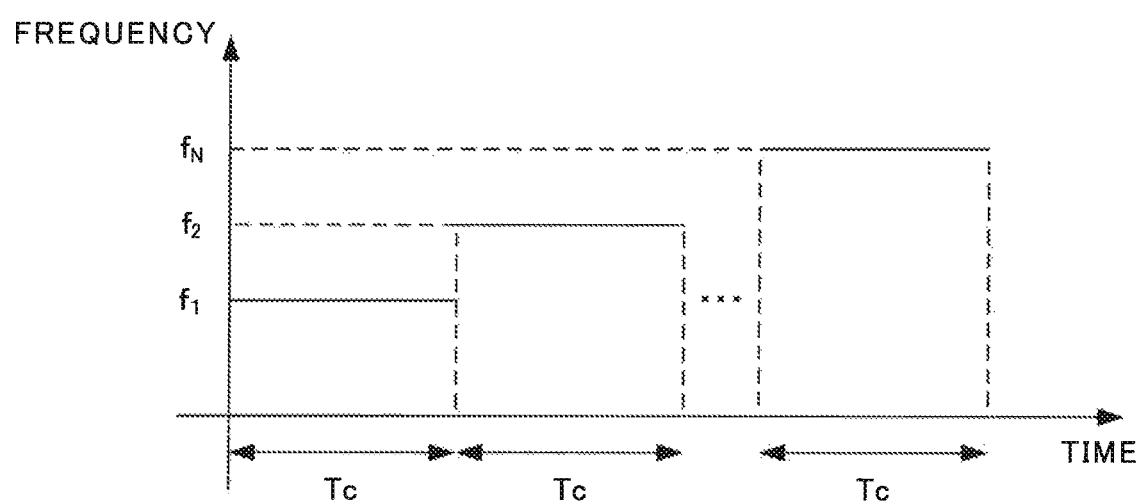
FIG. 5 is a diagram exemplifying respective frequencies in an oscillator
Figure 8:
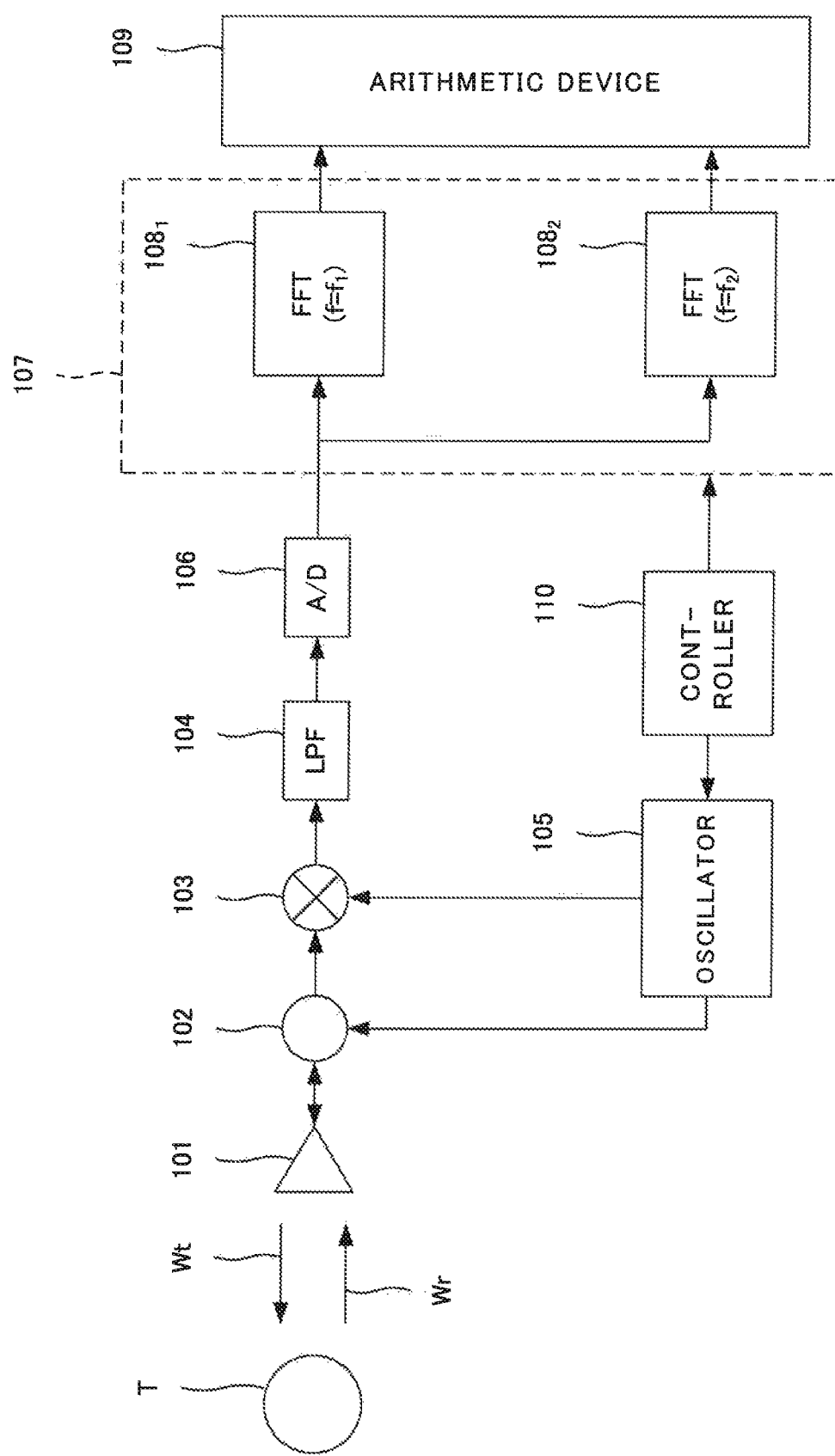
FIG. 8 is a block diagram of an automotive radar according to two-frequency CW method.
Figure 9:
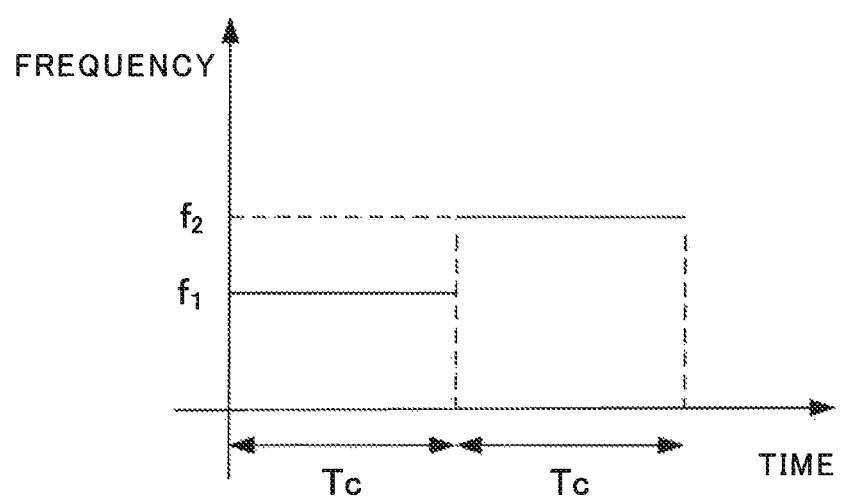
FIG. 9 is a diagram exemplifying RF signals (transmission signals) of two frequencies.
Figure 10:
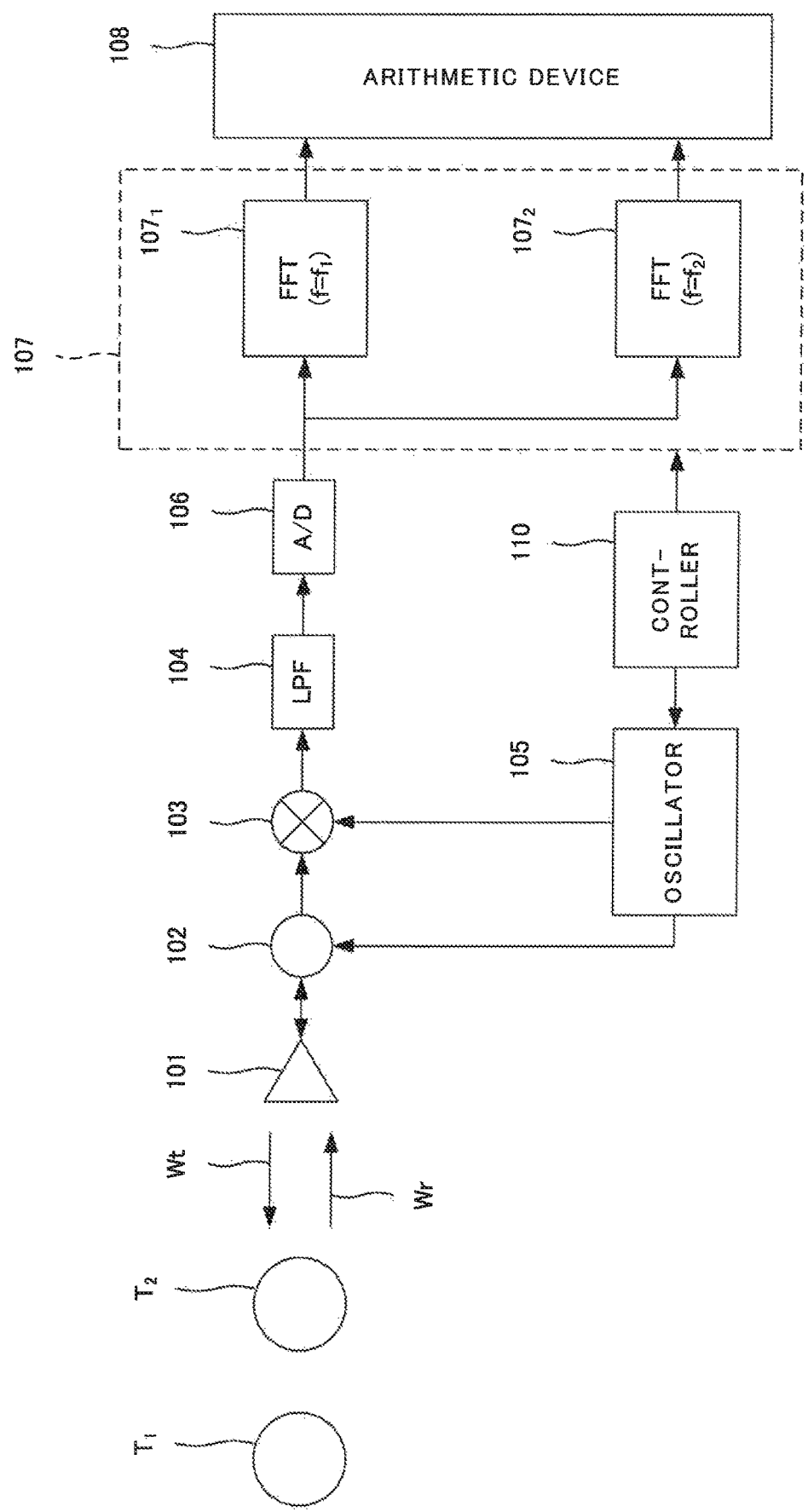
FIG. 10 is a block diagram of an automotive radar when simultaneously detecting two targets.
Figure 11:
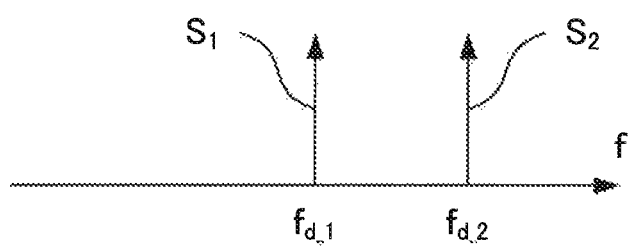
FIG. 11 is a figure exemplifying beat signals with different frequencies.
Figure 12:
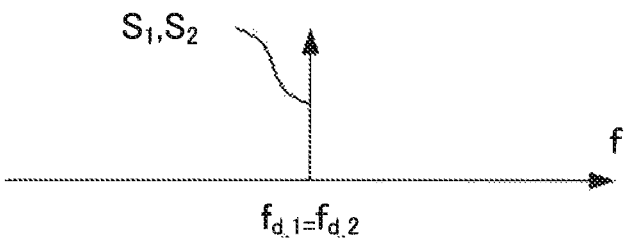
FIG. 12 is a figure exemplifying beat signals of the same frequency.

In addition, the oscillator 15 outputs RF signals (transmission signals) G3 of N frequencies $f_1 \ldots f_N$. FIG. 5 is a diagram exemplifying frequencies $f_1 \ldots f_N$ in the oscillator 15. Also in this case, the frequencies $f_1 \ldots f_N$ may be referred to as frequency for frequency $f_1$.

The number M of the targets T, and, the number N of the Fourier transforming devices 18, and the number N of frequencies of the frequency f are each a positive integer, and they are required to satisfy the relation of N≥M+1 as described later.

The controller 20 outputs the frequency switching command G1 to the oscillator 15 and outputs the Fourier transforming device switching command G2 to the Fourier transforming unit 17 in synchronization with the frequency switching command G1. As a result, the oscillator 15 outputs the transmission signal G3 of the frequency $f_i$ designated by the frequency switching command G1 to the circulator 12 and the mixer unit 13. In addition, the Fourier transforming unit 17 selects a Fourier transforming device $18_i$ corresponding to the frequency $f_i$ designated by the Fourier transforming device switching command G2, and the selected Fourier transforming device $18_i$ performs FFT (Fast Fourier Transform) transforming processing.

Such target information detection device 3C operates as follows. First, the transmission signal G3 output from the oscillator 15 to the circulator 12 is emitted to the target T as the transmission wave Wt from the antenna 11. The emitted transmission wave Wt is reflected by the target T and received by the antenna 11 as the reception wave Wr.

When the transmission wave Wt is reflected by the target T, the transmission wave Wt is modulated due to the Doppler effect. That is, due to the target $T_i$ of the velocity $V_i$, the frequency of the reception wave Wr is Doppler-shifted by the Doppler frequency $f_{di}$ (=$2V_i/\lambda$) with respect to the frequency of the transmission wave Wt.

The reception wave Wr is received by the antenna 11 and input to the mixer unit 13 as a reception signal via the circulator 12. The mixer 13a mixes the reception signal and the transmission signal, and the mixed signal is passed through the BPF 13b and is output to the A/D conversion device 13c as a beat signal.

When the frequency of the transmission signal G3 is fi, the beat signal $S_M(t, f_i)$ is given by $S_M(t, f_i) = \Sigma B_j \ldots$ (6). Note that Σ means the sum of 1 ... M with respect to j. Here, $B_j$ is given by $B_j = A_j \cdot \sin[2\pi f_{dj} t + \varphi_0 - 4\pi f_i R_j/c]$. $B_j$ is the beat signal of the reception signal by the reception wave Wr reflected by each target $T_j$. That is, the beat signal $S_M(t, f_i)$ in expression 6 is the sum of beat signals based on the received signal from each target T. $R_j$ is the target distance to each target $T_j$. $A_j$ is the amplitude of the beat signal obtained from the received signal from the target $T_j$. $\varphi_0$ is an undetermined constant.

Then, the beat signal is transformed into a digital signal by the A/D conversion device 13c, and the spectral phase is calculated by FFT transforming processing in the Fourier transforming unit 17. At this time, when the controller 20 instructs the oscillator 15 to output the transmission signal G3 of the frequency $f_i$ by the frequency switching command G1, the Fourier transforming unit 17 is instructed so that the Fourier transforming device $18_i$ corresponding to frequency $f_i$ performs the FFT transforming processing.

The arithmetic device 19 calculates the target distance Ri using the spectral phase calculated by the Fourier transforming device $18_i$.

Next, the calculation procedure of the target distance will be described. For simplicity of explanation, two targets $T_1$, $T_2$ of the same velocity will be considered.

In this case, the Doppler frequencies by the target $T_1$, $T_2$ are $f_{d1}$, $f_{d2}$, which are $f_{d1} = f_{d2}(\equiv f_d)$. Therefore, the beat signal $S_M(t, f_i)$ shown in the expression 6 is given by the expression 7 as follows.

$$S_2(t,f_i) = B_1 + B_2 \qquad (7)$$

In this case, $B_1$ and $B_2$ are as follows.

$$B_1 = A_1 \cdot \sin[2\pi f_d t + \varphi_0 - 4\pi f_i R_1/c]$$

$$B_2 = A_2 \cdot \sin[2\pi f_d t + \varphi_0 - 4\pi f_i R_2/c]$$

By transforming the beat signal $S_2(t)$ in the expression 7, the following expression 8 is obtained.

$$S_2(t,f_i) = A_{12}(f_i) \cdot \sin[2\pi f_d t + \Phi_{12}(f_i)] \qquad (8)$$

In this case, $\{A_{12}(f_i)\}^2$ and $\Phi_{12}(f_1)$ are as follows.

$$\{A_{12}(f_i)\}^2 = A_1^2 + A_2^2 + 2A_1 A_2 \cos[K \cdot f_i (R_2 - R_1)] \qquad (9)$$

$$\Phi_{12}(f_i) = \varphi_0 - K \cdot f_i \cdot R_1 + \tan^{-1}[X(A_1, A_2, R_1, R_2, f_i)] \qquad (10)$$

It should be noted that K is a constant, and is given by the expression 11.

$$K \equiv 4\pi/c \qquad (11)$$

The function $X(A_1, A_2, R_1, R_2, f_i)$ is given by the following expression 12.

$$X(A_1, A_2, R_1, R_2, f_i) = A_2 \cdot \sin(K \cdot f_i (R_2 - R_1))/[A_1 + A_2 \cdot \cos(K \cdot f_i (R_2 - R_1))] \qquad (12)$$

When the targets $T_1$, $T_2$ are at the same velocity, as can be understood from the expression 8, the beat signal $S_2(t, f_i)$ will contain only a single Doppler frequency $f_d$.

The amplitude $A_{12}(f_i)$ and phase $\Phi_{12}(f_i)$ of the beat signal shown in expressions 8 to 10 are values based on observation results. When the frequency $f_i$ of the transmission signal G3 output from the oscillator 15 is changed, the amplitude $A_{12}(f_i)$ and phase $\Phi_{12}(f_i)$ take different values.

For N transmission signals with frequencies $f_1 \ldots f_N$, N expressions are satisfied for each of the expressions 7 and 8. Therefore, the total number of expressions is 2N.

Then, the unknowns included in expressions 9 and 10 are five in total, i.e., $A_1, A_2, \varphi_0, R_1, R_2$. Therefore, if the number N of frequencies is larger by one than the number M (=2) of target (N≥M+1), the number of equations (=2N≥2(M+1)=6) is larger than the number of unknown numbers. The unknown numbers can be determined by selecting the same number of equations as the number of unknown numbers from the equations obtained above and solving the equations. It should be noted that $R_1$ can be obtained according to the procedure of the first embodiment. Therefore, the number of unknown numbers is four in total, i.e., $A_1$, $A_2$, $\varphi_0$, $R_2$.

This makes it possible to solve the equation 9 and the equation 10, so that multiple targets moving at the same velocity can be identified and the target information of each target can be detected.

Third Embodiment

A third embodiment of the present invention will be described. It should be noted that the same reference numerals are used for the same components as those of the first and second embodiments, and the description thereof will be omitted as appropriate.

In the present embodiment, there are a plurality of vehicles (first type target) B including a target-side velocity detection device 4A and a target-side communication device 4B, and a vehicle (second type target) C not equipped with these, and when each vehicle moves at the same velocity, the target information of each target is individually acquired.

FIG. 6 is an explanatory diagram of such a target information detection system 2. In the following description, it is assumed that there are p number of B vehicles (vehicles $B_1 \ldots B_p$)), which is the first type target, and there are q number of C vehicles (vehicles $C_1 \ldots C_q$)), which is the second type target. Therefore, the target number M is M=p+q. An example in which two vehicles B and two vehicles C are present (p=q=2) is illustrated in FIG. 6.

When each target is at the same velocity, the Doppler frequencies $f_{dj}$ in the beat signal $S_M$ of the expression 6 are all equal to the same frequency ($f_{dj}=f_d$).

That is, the beat signal $S_M$ indicated by the equation 6 is the sum of the beat signals of M targets having the same frequency $f_d$, and therefore, the beat signal $S_M$ is expressed by the expression 13 below.

$$S_M(t,f_i) = A_{12\ldots M}(f_i) \cdot \sin[2\pi f_i t + \Phi_{12\ldots M}(f_i)] \quad (13)$$

Also, when the beat signal $S_M$ in the expression 6 is expressed recursively, the beat signal $S_M$ is expressed by the following expressions 14 and 15.

$$S_M(t,f_1) = S_{(M-1)}(t,f_i) + A_M \cdot \sin[2\pi f_d t + \varphi_0 - 4\pi f_i R_M/c] \quad (14)$$

$$S_{(M-1)}(t,f_i) = A_{12\ldots(M-1)}(f_i) \cdot \sin[2\pi f_d t + \Phi_{12\ldots(M-1)}(f_i)] \quad (15)$$

The relationship of the amplitude and the phase of the beat signal $S_M(t, f_i)$ when there are M targets and the amplitude and the phase of the beat signal $S_{(M-1)}(t, f_i)$ when there are (M-1) targets are given by the expressions 16, 17 below.

$$\{A_{12\ldots M}(f_i)\}^2 = \{A_{12\ldots(M-1)}(f_i)\}^2 + A_M^2 + 2A_{12\ldots(M-1)}(f_i) \, A_M \cos[\alpha(\Phi_{12\ldots(M-1)}(f_i), R_M f_i, \varphi_0)] \quad (16)$$

$$\Phi_{12\ldots M}(f_i) = \Phi_{12\ldots(M-1)}(f_i) + \tan^{-1}[\beta(A_{12\ldots(M-1)}(f_i), A_M, R_M f_i, \varphi_0)] \quad (17)$$

In this case, the following expressions hold.

$$\alpha(\Phi_{12\ldots(M-1)}(f_i), R_M f_i, \varphi_0) = \varphi_0 - 4\pi f_i R_M/c + \Phi_{12\ldots(M-1)}(f_i) \quad (18)$$

$$\beta(A_{12\ldots(M-1)}(f_i), A_M, R_M f_i, \varphi_0) = A_M \cdot \sin(\alpha(\Phi_{12\ldots(M-1)}(f_i), R_M f_i, \varphi_0))/[A_{12\ldots(M-1)}(f_i) + A_M \cos(\alpha(\Phi_{12\ldots(M-1)}(f_i), R_M f_i, \varphi_0))] \quad (19)$$

By applying a recursive method to the equations 16 to 19 with respect to the target number M, the amplitude $A_{12\ldots M}(f_i)$ and the phase $\Phi_{12\ldots M}(f_i)$ of the beat signal can be expressed by the amplitude parameters $A_1, A_2 \ldots A_M$, the phase parameter $\varphi 0$, and the position parameters $R_1$, $R_2 \ldots R_M$.

Here, the amplitudes $A_{12\ldots M}(f_i)$ and the phase $\Phi_{12\ldots M}(f_i)$ of the beat signal are known variables obtained by measurement, and the amplitude parameters $A_1, A_2 \ldots A_M$ and the phase parameters $\varphi_0$, and the position parameters $R_1, R_2 \ldots R_M$ are unknown variables.

When the frequency $f_i$ takes N values (i=1, 2, . . . , N), the amplitude $A_{12\ldots M}(f_i)$ and the phase $\Phi_{12\ldots M}(f_i)$ of the beat signal are converted into a total of 2N equations expressed by the amplitude parameters $A_1, A_2 \ldots A_M$, the phase parameter $\varphi_0$, and the position parameters $R_1, R_2 \ldots R_M$ are generated.

On the other hand, the total number of unknown variables [amplitude parameters $A_1, A_2 \ldots A_M$ and phase parameters $\varphi_0$, position parameters $R_1, R_2 \ldots R_M$] is 2M+1 in total. Since p position parameters (i.e., the position of the vehicles $B_1 \ldots B_p$) among the M position parameters $R_1, R_2 \ldots R_M$ are obtained from the target-side velocity detection devices $4A_1 \ldots 4A_p$, they are known parameters. Therefore, the actual number of unknown parameters is (2M−p+1).

Therefore, when the number N of frequencies of the transmission signals which are the measurement frequencies is equal to or more than (2M−p+1)/2, the 2N simultaneous equations are solved and the target distances $R_1, R_2 \ldots R_M$ are derived. It should be noted that (2M−p+1)/2 is also q+(p+1)/2.

The above explanation is applicable as it is even if the position relationship between the vehicle $B_1$ . . . vehicle $B_p$ and the vehicle $C_1$ . . . vehicle $C_q$ is arbitrarily exchanged. Further, in FIG. 6, the direction in which the target information detection device 3C emits the transmission wave Wt is set as the forward direction of the vehicle A. However, there is no particular limitation on the emission direction of the transmission wave Wt, and it can be the backward direction or the lateral direction of the vehicle A as described above.

In the present embodiment, while only the target information detection device operating with the two-frequency CW method (multi-frequency CW method) is used, the target information of each target can be obtained by using both the communication means and the velocity detection means, even when the relative velocity between the target information detection device and the target becomes "0" according to the two-frequency CW method or the multi-frequency CW method. Even when there are multiple targets of the same velocity as the target information detection device, each target information can be acquired while identifying each target.

Therefore, the bandwidth of the RF signal and BB signal can be made narrower than in the case of using the broadband radar method. This makes it easier to design the circuit and reduces the cost of the device. In addition, there is an effect that it is also possible to avoid a problem of deterioration in spectral efficiency and interference caused by widening of the band of the transmission signal G3.

Furthermore, even when the relative velocity between the target information detection device and the target can be regarded as "0" or roughly "0", the target information can be acquired, and it is not necessary to perform control such as automatically controlling the velocity (throttle and brake) of the car so that the relative velocity does not become "0". Therefore, there is an advantage in that it is possible to detect other vehicles while maintaining the state of moving at the same velocity as other vehicles, and it is possible to achieve stable movement.

Although the present invention has been described with reference to the embodiments (and examples), the present invention is not limited to the above embodiments (and examples). Various changes that can be understood by those skilled in the art within the scope of the present invention can be made to the configuration and details of the present invention.

This application claims the priority based on Japanese Patent Application No. 2015-204174 filed on Oct. 16, 2015, the disclosure of which is incorporated herein in its entirety.

REFERENCE SIGNS LIST 2 target information detection system
3 measurement-side unit
3A measurement-side velocity detection device
3B measurement-side communication device
3C target information detection device
4 target-side unit
4A target-side velocity detection device
4B target-side communication device
11 antenna
12 circulator
13 mixer unit
13a mixer
13b band pass filter (BPF)
13c analog-to-digital (A/D) transforming device
15 oscillator
17 Fourier transforming unit
$18_1$ ... $18_N$ Fourier transforming device
19 arithmetic device
20 controller

The invention claimed is:

1. A target information detection system that emits a transmission wave of a predetermined frequency from a measurement-side moving body to a plurality of targets and obtains, as target information, a distance between the measurement-side moving body and the target from a Doppler frequency contained in a reflected wave thereof, the target information detection system comprising:
  a target information detection device that calculates the target information based on the Doppler frequency;
  a measurement-side velocity detection device that detects a velocity of the measurement-side moving body as a moving body velocity;
  a measurement-side unit that includes at least a measurement-side communication device communicating with the target information detection device and the measurement-side velocity detection device, the measurement-side unit being mounted on the measurement-side moving body;
  a target-side velocity detection device that detects a velocity of the target as a target velocity; and
  a target-side unit that includes at least a target-side communication device communicating with the target-side velocity detection device and the measurement-side communication device, the target-side unit being mounted on the target,
  wherein in a case where the target information detection device determines from the Doppler frequency that a relative velocity between the measurement-side moving body and the target is equal to or less than a mode switching velocity, the target information detection device switches a target information detection mode from a Doppler mode to a communication mode and obtains the moving body velocity via the measurement-side communication device, and obtains the target velocity via the measurement-side communication device and the target-side velocity detection device, and calculates the target information using the moving body velocity and the target velocity,
  wherein the target information detection device measures the target information by multi-frequency CW method in which number of frequencies to be used, N, is two or more (N≥2: where N is a positive integer), and
  wherein in a case where the plurality of targets include p first type targets (p is a positive integer) each including the target-side communication device and the target-side velocity detection device and include q second type targets (q is a positive integer) not including the target-side communication device and the target-side velocity detection device, the number N of frequencies to be used by the target information detection device satisfy N≥q+(p+1)/2.

2. A target information detection method of emitting a transmission wave of a predetermined frequency from a measurement-side moving body to a plurality of targets and obtaining, as target information, a distance between the measurement-side moving body and the target from a Doppler frequency contained in a reflected wave thereof, the target information detection method comprising:
  causing a target information detection device to calculate the target information based on the Doppler frequency;
  causing a measurement-side velocity detection device to calculate a velocity of the measurement-side moving body as a moving body velocity;
  causing a measurement-side communication device to communicate with the target information detection device and the measurement-side velocity detection device; and
  causing a target-side velocity detection device to detect a velocity of the target as a target velocity;
  causing a target-side communication device to communicate with the target-side velocity detection device and the measurement-side communication device,
  wherein in a case where a relative velocity between the measurement-side moving body and the target is determined, from the Doppler frequency, to be equal to or less than a mode switching velocity, switching a target information detection mode from a Doppler mode to a communication mode and obtaining the moving body velocity via the measurement-side communication device, and obtaining the target velocity via the measurement-side communication device and the target-side velocity detection device, and calculating the target information using the moving body velocity and the target velocity,
  wherein the target information detection device measures the target information by multi-frequency CW method in which number of frequencies to be used is two or more (N≥2: where N is a positive integer), and
  wherein in a case where the plurality of targets include p first type targets (p is a positive integer) each including the target-side communication device and the target-side velocity detection device and include q second type targets (q is a positive integer) not including the target-side communication device and the target-side velocity detection device, the number N of frequencies to be used by the target information detection device satisfy N≥q+(p+1)/2.

* * * * *